United States Patent
Warke et al.

(10) Patent No.: US 10,690,756 B2
(45) Date of Patent: Jun. 23, 2020

(54) METHODS AND APPARATUS FOR LIDAR OPERATION WITH PULSE POSITION MODULATION

(71) Applicant: TEXAS INSTRUMENTS INCORPORATED, Dallas, TX (US)

(72) Inventors: Nirmal C. Warke, Saratoga, CA (US); David P. Magee, Allen, TX (US); Baher S. Haroun, Allen, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 296 days.

(21) Appl. No.: 15/484,975

(22) Filed: Apr. 11, 2017

(65) Prior Publication Data
US 2017/0329010 A1 Nov. 16, 2017

Related U.S. Application Data

(60) Provisional application No. 62/334,107, filed on May 10, 2016.

(51) Int. Cl.
*G01S 7/487* (2006.01)
*G01S 17/10* (2020.01)

(52) U.S. Cl.
CPC ............ *G01S 7/487* (2013.01); *G01S 17/10* (2013.01)

(58) Field of Classification Search
CPC .......... G01S 17/10; G01S 17/87; G01S 17/89; G01S 17/936; G01S 7/4816; G01S 7/484; G01S 7/486; G01S 7/4863
See application file for complete search history.

(56) References Cited

U.S. PATENT DOCUMENTS

| | | | |
|---|---|---|---|
| 5,742,379 | A | 4/1998 | Reifer |
| 5,745,437 | A | 4/1998 | Wachter et al. |
| 5,784,023 | A | 7/1998 | Bluege |
| 5,889,490 | A | 3/1999 | Wachter et al. |
| 6,369,880 | B1 | 4/2002 | Steinlechner |
| 7,262,402 | B2 * | 8/2007 | Niclass ............ H01L 27/14647 250/208.1 |

(Continued)

FOREIGN PATENT DOCUMENTS

| EP | 1055941 | 11/2000 |
|---|---|---|
| EP | 2963445 | 6/2016 |

OTHER PUBLICATIONS

International Search Report in corresponding PCT Patent Application No. PCT/US2017/031994, dated Aug. 14, 2017 (2 pages).

(Continued)

*Primary Examiner* — Luke D Ratcliffe
(74) *Attorney, Agent, or Firm* — Michael A. Davis, Jr.; Charles A. Brill; Frank D. Cimino

(57) ABSTRACT

Described examples include an integrated circuit that includes an encoder configured to modulate a driving signal for an optical transmitter with a plurality of encoded pulses corresponding to a code, in which the driving signal is transmitted to the optical transmitter periodically. The integrated circuit also includes a demodulator configured to receive a received signal from an optical receiver that is configured to receive a reflection of light transmitted by the optical transmitter off an object, the demodulator configured to discriminate the plurality of encoded pulses in the received signal and estimate a distance of the object.

19 Claims, 5 Drawing Sheets

(56) References Cited

U.S. PATENT DOCUMENTS

| | | |
|---|---|---|
| 7,512,237 B1 | 3/2009 | Schantz et al. |
| 7,701,559 B2 | 4/2010 | Bridges et al. |
| 2004/0105087 A1 | 6/2004 | Gogolla et al. |
| 2009/0059201 A1* | 3/2009 | Willner .................. G01S 7/491 356/5.01 |
| 2010/0027602 A1* | 2/2010 | Abshire ................. G01S 17/10 375/224 |
| 2016/0003946 A1* | 1/2016 | Gilliland ................ G01S 17/10 356/5.01 |
| 2016/0025843 A1 | 1/2016 | Sebastian et al. |
| 2016/0231420 A1 | 8/2016 | Kryvobok |
| 2017/0082737 A1 | 3/2017 | Slobodyanyuk et al. |

OTHER PUBLICATIONS

Baltsavias E.P., "Airbone laser scanning: basic relations and formulas," ISPRS J Photogramm Remote Sens (1999) 54:199-214. doi:10.1016/S0924-2716(99)00015-5 Elsevier B.V., Radarweg 29, 1043 NX Amsterdam, The Netherlands, accessed Apr. 11, 2017, http://www2.geog.ucl.ac.uk/~mdisney/teaching/teachingNEW/PPRS/papers/Baltsavias_Lidar.pdf.

Chung et al., "Optical Orthogonal Codes: Design, Analysis, and Applications," IEEE Trans on Information Theory, vol. 35. No. 3, May 1989, IEEE, 445 Hoes Lane, Piscataway, NJ 08854-4141 USA; accessed Apr. 11, 2017 http://www.math.ucsd.edu/~fan/mypaps/fanpap/97_opticalorthocodes.pdf.

\* cited by examiner

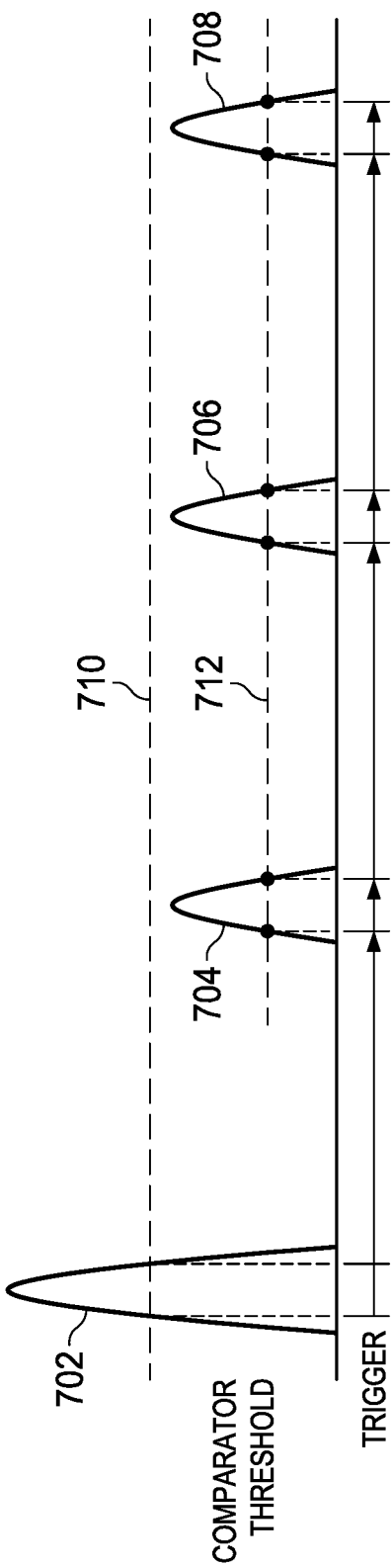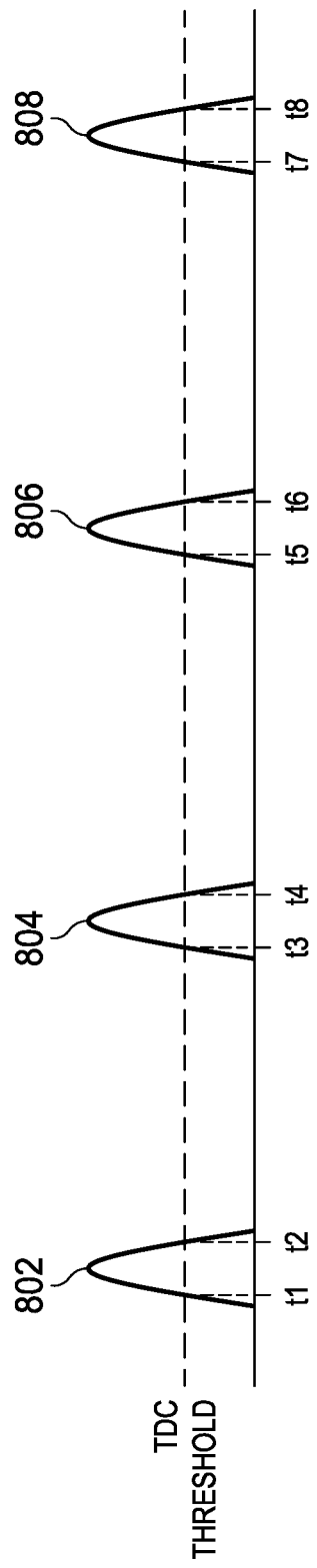

METHODS AND APPARATUS FOR LIDAR OPERATION WITH PULSE POSITION MODULATION

CROSS-REFERENCE TO RELATED APPLICATIONS

This application claims the benefit under 35 U.S.C. § 119(e) to co-owned U.S. Provisional Application Ser. No. 62/334,107, entitled "Method for Interference Free LIDAR operation with Pulse Position Modulation," filed May 10, 2016, naming Warke, et. al. as inventors, which is hereby incorporated by reference in its entirety herein. In addition, this application is related to the following co-owned applications: U.S. Provisional Application Ser. No. 62/334,098, filed May 10, 2016, entitled "Method for Interference Free LIDAR Operation with Narrowband Intensity Modulation," naming Warke, et. al. as inventors; U.S. patent application Ser. No. 15/396,457, filed Dec. 31, 2016, entitled "Methods and Apparatus for Lidar Operation with Narrowband Intensity Modulation," naming Warke, et. al. as inventors; and U.S. Provisional Application Ser. No. 62/334,117, entitled "Method for Interference Free LIDAR Operation with Time Sequencing Pulses," filed May 10, 2016, naming Warke, et. al. as inventors; which applications are each hereby incorporated by reference in their entirety herein.

TECHNICAL FIELD

This disclosure relates generally to lidar, and, in particular, to preventing interference between lidar devices.

BACKGROUND

Lidar is a ranging technology used to estimate distance to a target based on transmitting light energy. Typical lidar systems operate by reflecting a transmitted narrow pulse of light off a target and estimating the amount of time it takes the pulse to return. An alternative approach is amplitude modulated continuous wave (AMCW) based lidar. In AMCW lidar, the transmitter modulates the intensity of the light with a continuous wave (CW) signal. The receiver typically estimates the time of flight based on the phase of the received CW signal relative to the transmitted CW signal.

As noted hereinabove, lidar (also called LIDAR, LiDAR, and LADAR) is a method for measuring distance to a target by illuminating that target with a laser light. The name lidar is sometimes considered an acronym of Light Detection and Ranging or Light Imaging, Detection, And Ranging. Lidar was originally a portmanteau of the words "light" and "radar." In lidar systems, a source transmits light into a field of view and the light reflects off objects. Sensors receive the reflected light. In some lidar systems, a flash of light illuminates an entire scene. In the flash lidar systems, arrays of time-gated photodetectors receive reflections from objects illuminated by the light, and the time it takes for the reflections to arrive at various sensors in the array is determined. In an alternative approach, a scan such as a raster scan can illuminate a scene in a continuous scan fashion. A source transmits light or light pulses during the scan. Sensors that can also scan the pattern, or fixed sensors directed towards the field of view, receive reflective pulses from objects illuminated by the light. The light can be a scanned beam or moving spot. Time-of-flight computations can determine the distance from the transmitter to objects in the field of view that reflect the light. The time-of-flight computations can create distance and depth maps. Light scanning and lidar applications include: ranging; metrology; mapping; surveying; navigation; microscopy; spectroscopy; object scanning; and industrial applications. Recently, lidar applications also include: security; robotics; industrial automation; and mobile systems. Vehicles use lidar navigation and collision avoidance systems. Autonomous vehicles and mobile robots use lidar for collision avoidance and scene detection.

Lidar systems operating in the same environment may interfere with one another, as there is no way for each lidar system to discriminate its return signal from that of other lidar systems. In industrial environments, more than one robot or another device may be employing lidar. In automotive applications, other vehicles may be using lidar in the same area. Interference between lidar systems can result in erroneous operation. In safety critical applications, such as automotive or industrial applications, this type of operational malfunction is not acceptable.

SUMMARY

In accordance with an example embodiment, an integrated circuit includes an encoder configured to modulate a driving signal for an optical transmitter with a plurality of encoded pulses corresponding to a code in which the driving signal is transmitted to the optical transmitter periodically. The integrated circuit also includes a demodulator configured to receive a received signal from an optical receiver that is configured to receive the reflection of light transmitted by the optical transmitter off an object, the demodulator configured to discriminate the plurality of encoded pulses in the received signal and estimate a distance to the object.

BRIEF DESCRIPTION OF THE DRAWINGS

FIG. 7 is a graph showing timing of an embodiment decoding system.

FIG. 8 is a graph showing timing of another embodiment decoding system.

DETAILED DESCRIPTION OF THE EMBODIMENTS

Corresponding numerals and symbols in the different figures generally refer to corresponding parts unless otherwise indicated. The figures are not necessarily drawn to scale.

The term "coupled" may include connections made with intervening elements, and additional elements and various connections may exist between any elements that are "coupled."

Figure 1:
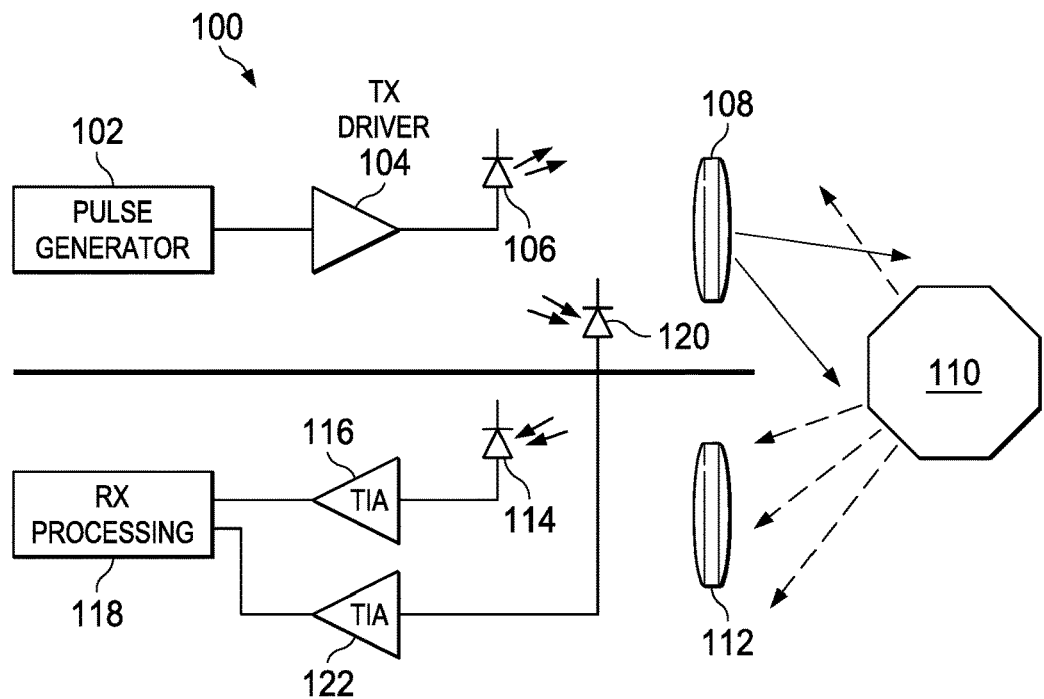
FIG. 1 is a block diagram of a pulsed lidar in operation.

FIG. 1 is a block diagram of a pulse-type lidar and illustrates the system in operation. Lidar 100 includes pulse generator 102, which provides timed pulses to transmit driver 104. Transmit driver 104 drives laser diode 106. Optics 108 collimates and directs the pulsed light onto a field of view that includes object 110. Optics 108 may be a fixed lens system or one of many mechanisms for scanning the light signal across a scene. For example, mechanically driven mirrors can be used. Object 110 reflects and scatters the light signal. Optics 112 receives a portion of the reflected light signal and focuses it on photodiode 114. Optics 112 can track the scanning operation. Trans-impedance amplifier (TIA) 116 amplifies the output of photodiode 114 and provides the amplified signal to receive processing unit 118. In some configurations, a photodiode 120 is positioned to receive a portion of the light signal directly from laser diode 106. TIA 122 amplifies the output of photodiode 120 and provides the output to receive processing unit 118. Receive processing unit 118 includes analog-to-digital converters (ADCs, not shown) that convert the signals received from TIA 116 and TIA 122 to digital format for further processing as described hereinbelow regarding FIG. 2.

Figure 2:
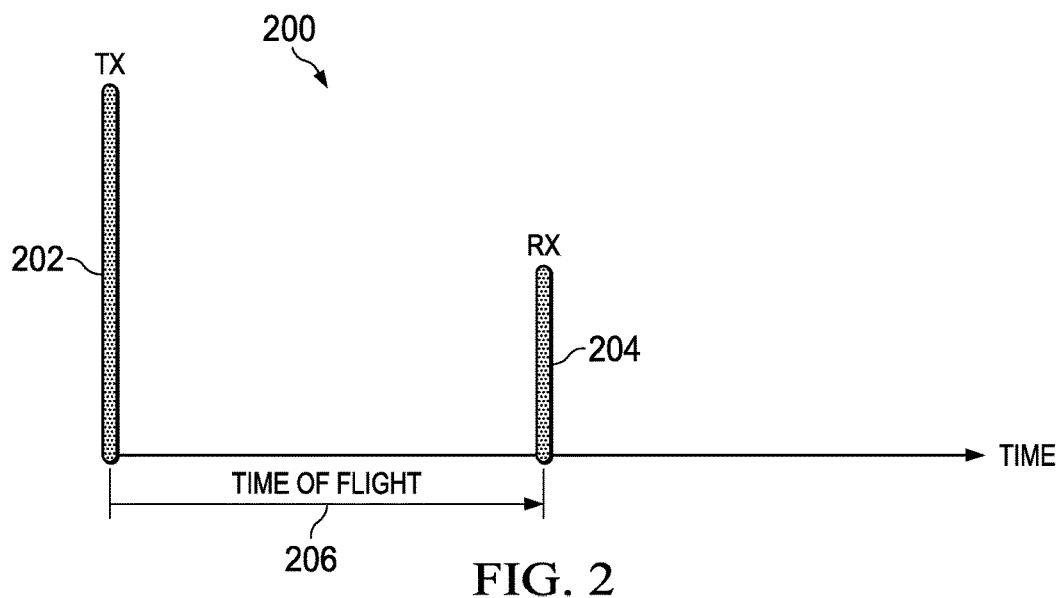
FIG. 2 is a signal graph showing an operation of the lidar of FIG. 1.

FIG. 2 is a graph showing the operation of lidar 100 of FIG. 1. Graph 200 shows transmit pulse 202 at a first time followed by receive pulse 204. The speed of light is known, so the distance of object 110 (FIG. 1) from the transmitter can be estimated using time of flight 206. That is, the distance is estimated as given in Equation 1:

$$d = (c \ast t_{TOF})/2 \qquad (1)$$

Where: d is the distance, c is the speed of light and $t_{TOF}$ is the time of flight. The speed of light times the time of flight is halved to account for the travel of the light pulse to, and from, the object.

Receive pulse 204 has significantly smaller amplitude than transmit pulse 202. The difference between the amplitudes of the transmit pulse and the receive pulse in an application is much greater than the example shown in FIG. 2. The reduced amplitude in the received pulse is caused by scattering, absorption and divergence of the transmitted light. Therefore, it is sometimes difficult to discriminate between the receive pulse 204 and noise. In addition, the losses during flight make it necessary to use powerful lasers to ensure that the receiving photodiode receives a pulse of adequate amplitude.

Figure 3:
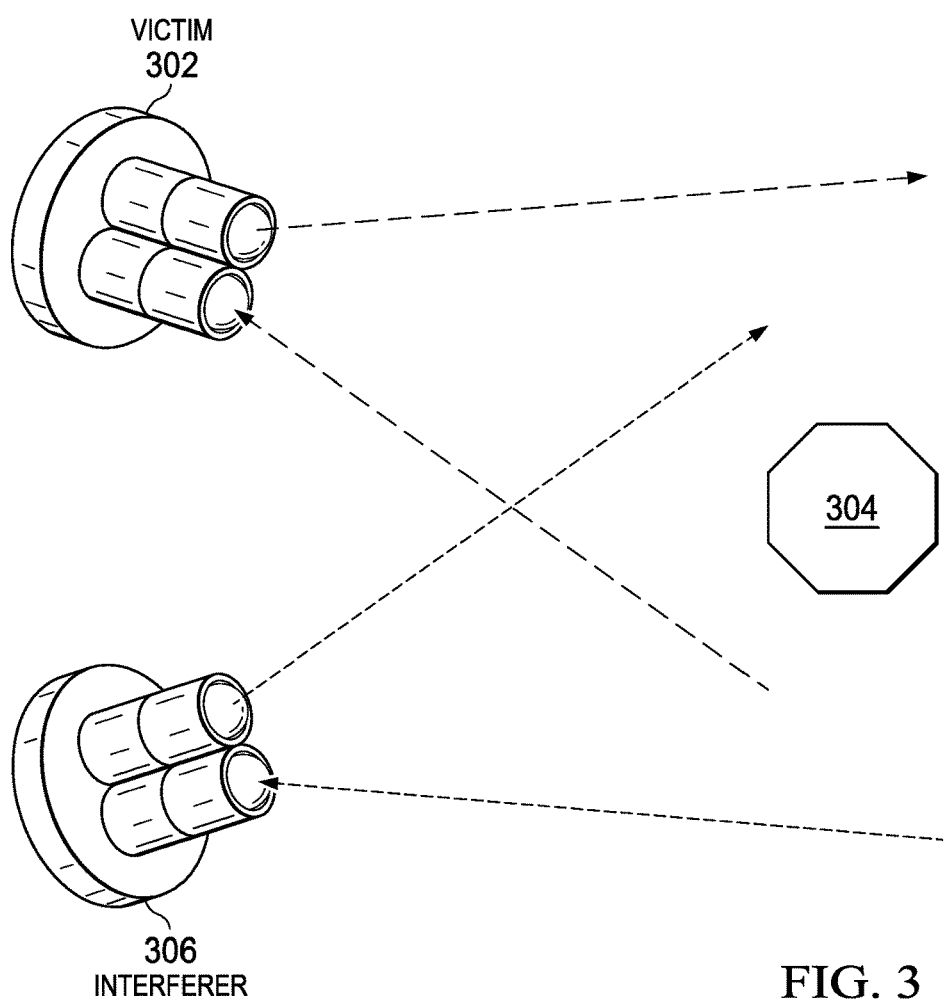
FIG. 3 is a block diagram that illustrates an additional problem with lidar systems.

FIG. 3 illustrates an additional problem with the device of FIG. 1. If multiple lidars are operating in the same environment, it is not possible for a receiver to discriminate between an intended return pulse (like receive pulse 204, FIG. 2) and a return pulse from another lidar. For example, in FIG. 3, victim lidar 302 is attempting to range object 304. However, interferer lidar 306 is also attempting to range object 304. Victim lidar 302 has no way to determine that a received pulse is a return from the pulse transmitted by itself or is a return from interferer lidar 306. A time of flight calculated from any input other than the proper receive pulse produces an erroneous distance estimate.

Figure 4:
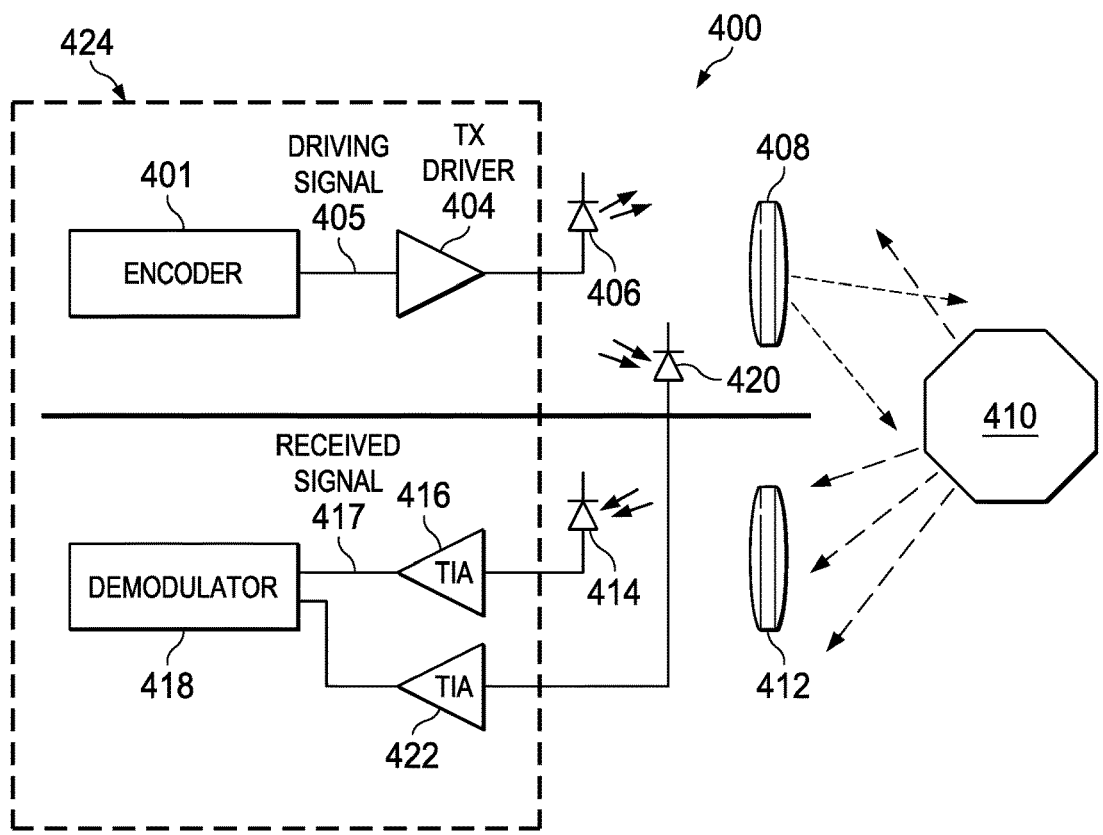
FIG. 4 is a block diagram of an embodiment lidar system in operation.

FIG. 4 is a schematic diagram of an embodiment for a lidar system and illustrates the system operation. Lidar 400 includes encoder 401, which determines a code corresponding to a sequence of pulses (as further explained hereinbelow) and provides a pulse position modulated signal having a series of pulses corresponding to the code. The modulated pulses drive transmit driver 404, which generates a driving signal 405 to drive an optical transmitter such as laser diode 406. The modulated signal controls the timing of light pulses transmitted by laser diode 406. Optics 408 directs the modulated light pulses to object 410. Optics 408 can be a fixed lens system or one of many mechanisms for scanning the light signal across a scene.

Optics 412 focuses a reflection of the modulated light pulses reflected by object 410 onto an optical receiver such as photodiode 414. In addition, the optional photodiode 420 receives a reference modulated light pulse signal directly from laser diode 406. TIA 416 amplifies the signal received by photodiode 414 to provide received signal 417 that is output to demodulator 418. TIA 422 amplifies the signal received by photodiode 420 and provides that signal to demodulator 418.

Demodulator 418 detects and converts the transmitted pulses to digital format and processes the received signals, knowing the coded sequence that was transmitted. The encoding of the modulated pulses by encoder 401 is orthogonal or nearly orthogonal to encoding used by other potentially interfering lidars. Orthogonal codes are codes designed to have little or no cross correlation so that they may be discriminated from one another. That is, because the modulated signals are orthogonal, even if lidar 400 receives the modulated pulses from another lidar (not shown) while receiving the modulated pulses from laser diode 406 reflected off object 410, demodulator 418 can distinguish the correct code and its timing from codes transmitted by other lidars. The codes can be preassigned to encoder 401 and can be generated, for example, using techniques described in Chung, et al., "Optical Orthogonal Codes: Design, Analysis, and Applications", IEEE Trans. on Information Theory, Vol 35. No 3, May 1989. An alternative uses a pseudo-random generator to continuously vary (modulate) the position of the pulses. The advantage of this alternative is that this approach does not require coordination between the lidar systems. An example of this alternative would use a pseudorandom binary sequence (PRBS) generator to determine the position of the pulses that correspond to the "1" in the code sequence. This alternative coding does not provide full orthogonality, but the chance of a conflict is low and conflicts can be determined by outlier analysis. In an embodiment, TIAs 416 and 422 and analog front end (AFE) components within demodulator 418 are the same or similar. This feature allows common delays and non-linearities to be factored out by comparing the two signals output by TIA 422 and TIA 416.

In an embodiment, transmit driver 404 provides a sync signal to demodulator 418 to indicate when transmit driver 404 transmits a pulse. Encoder 401, transmit driver 404, demodulator 418 and TIAs 416 and 422 may be partially or wholly incorporated into an integrated circuit as indicated by group 424. For example, an integrated circuit may generate the signals and apply the driving signal 405 to laser diode 406 using one or more power transistors or power modules. Transmit driver 404 may be implemented with discrete components or by several components incorporated into a module. In some configurations, one integrated circuit may drive multiple laser diodes. In other configurations, a separate circuit drives each of multiple laser diodes and a common demodulator 418 analyzes the signals. The demodulator 418 may include a digital signal processor, a reduced instruction set computer (RISC) core such as an Advanced RISC Machines (ARM) core (a product of ARM, Ltd.) or another suitable processor. Demodulator 418 can include analog to digital converters (ADCs), time to digital converter (TDCs) and other circuitry coupled to the received signals from the TIA 416 and from TIA 422 to enable digital processing of the signals.

Figure 5:
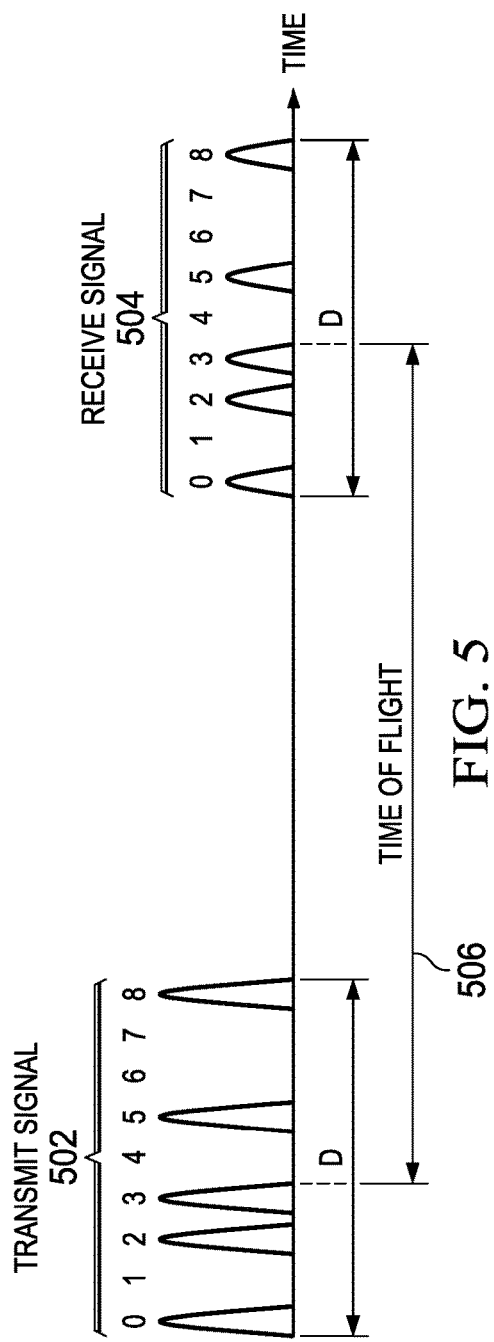
FIG. 5 is a graph showing modulated signals used in example embodiments.

FIG. 5 is a graph showing modulated signals. Transmit pulses 502 are modulated pulses having a duration D. Transmit pulses 502 may be all the same amplitude and duration or may have different amplitudes and durations. Duration D includes nine time slots illustrated in FIG. 5. This is a simplification for illustration purposes. In application, each pulse could be about 1 ns. The duration D may be 100 ns to several μS. Each pulse position may or may not have a pulse. Therefore, the number of pulses may be from 100 to several hundred thousand. If a lack of a pulse at a position represents a zero and a pulse at that position represents a one, then the position of the pulses is a digital code. In the example shown in FIG. 5, there are pulses in the 0, 2, 3, 5 and 8 spots in pulses 502, so the code is 101101001 (or 100101101 going from the 8 spot to the 0 spot). As shown in FIG. 5, pulses 504 reflect this code. The code is selected to be orthogonal to codes used by other lidars. A central authority may distribute the codes to the devices in an environment such as a factory using an installation process or distributed using a digital link, such as a Wi-Fi connection to a controlling computer. Codes are orthogonal if all pair-wise cross correlations are approximately zero. An example of useful orthogonal codes are Walsh codes. The longer the code, the more orthogonal codes are available and, even if not fully orthogonal, the cross correlations can be low enough to be insignificant. Receive signal 504 has the same duration D and the same pulses at the same positions, but delayed by the time of flight shown as 506.

In addition, because the transmit energy of transmit pulses 502 is spread over multiple pulses within transmit pulses 502, the peak intensity transmitted by laser diode 406 (FIG. 4) can be lowered while still providing adequate energy in the receive pulses 504 for photodiode 414 (FIG. 4) to accurately detect the received signal. The transmit waveform can be relatively long, for example, from 100 nS to a few μS. Thus, laser diode 406 and transmit driver 404 (FIG. 4) can be cheaper and more compact than those used in prior systems. In addition, photodiode 414 may be implemented using a p-type-intrinsic-n-type (PiN) photodiode, avalanche photodiode (APD) or silicon photomultiplier (SiPM). Further, by using orthogonal codes, the transmit signals are unique for each lidar, enabling lidars to operate interference free in the same environment. For example, in an application where embodiments may be applied, a warehouse or factory may have many robots and/or autonomous carts for transporting goods or parts. If these robots and/or carts include lidar for collision avoidance or navigation, orthogonal codes can be assigned to each device. Therefore, in this example, the lidar in one cart will not disrupt the operation of the lidar in another cart.

Figure 6:
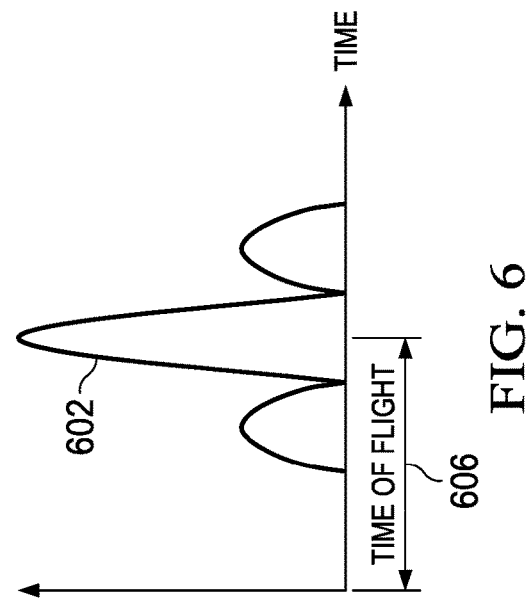
FIG. 6 is a correlation graph of a receive signal.

FIG. 6 is a graph of a correlation performed by demodulator 418 (FIG. 4) between transmitted pulses 502 (FIG. 5) and received pulses 504 (FIG. 5). Peak 602 corresponds to the time of flight 606. TIA 416, TIA 422 and the analog front end (AFE) components within demodulator 418 (all in FIG. 4) are as identical as possible. Therefore, common delays and common distortion will equally affect the received pulses 504 (FIG. 5) and the reference signal received through photodiode 420 (FIG. 4). Demodulator 418 (FIG. 4) may include an analog comparator or may include analog to digital converters (ADCs, not shown) or time to digital converters (TDCs, not shown) for converting the received signals to a digital form. Because the transmitted code is orthogonal, peak 602 shows a high correlation signal, even in the presence of interference from another lidar. In addition, transmit driver 404 (FIG. 4) may provide a sync signal to demodulator 418 (FIG. 4) to allow for estimating the delay for the peak correlation.

FIG. 7 is a graph of a series of received pulses illustrating another embodiment. Demodulator 418 (FIG. 4) receives pulses 702, 704, 706 and 708 from TIA 416 (FIG. 4) that are converted to a digital signal using an analog to digital converter (ADC, not shown) in demodulator 418 (FIG. 4). In this embodiment, the first pulse 704 has an increased intensity (stronger). This attribute allows for more accurate detection of the first pulse. The first pulse is detected when pulse 702 crosses threshold 710. Demodulator 418 (FIG. 4) then monitors the received signal to determine when pulses 704, 706 and 708 cross threshold 712. Each of the pulses crosses the threshold twice: once when rising and once when falling. Thus, four pulses yield eight timing points. The average of these timing points more accurately determines the time of flight, which is used to determine the distance of the object using Equation 1. Demodulator 418 (FIG. 4) also compares the timing points to the transmitted code to accurately determine that the received signal corresponds to the transmitted signal, thus rejecting signals from other devices and spurious noise.

FIG. 8 is a graph of a series of received pulses illustrating another embodiment. In this embodiment, demodulator 418 (FIG. 4) includes time to digital converters (TDCs, not shown). When detecting pulses, TDCs output a time stamp (time signal) at the rising edge of the pulse, the falling edge of the pulse or both. Using both rising edge and falling edge data, pulse 802 produces times $t_1$ and $t_2$, pulse 804 produces times $t_3$ and $t_4$, pulse 806 produces times $t_5$ and $t_6$, and pulse 808 produces times $t_7$ and $t_8$. These times are processed by demodulator 418 (FIG. 4) to determine the time of flight of the laser signal, which is used to determine the distance using Equation 1. Demodulator 418 (FIG. 4) may use a processed reference signal from photodiode 420 (FIG. 4) or from a sync signal provided by transmit driver 404 (FIG. 4) to demodulator 418 (FIG. 4) in determining the time of flight.

Figure 9:
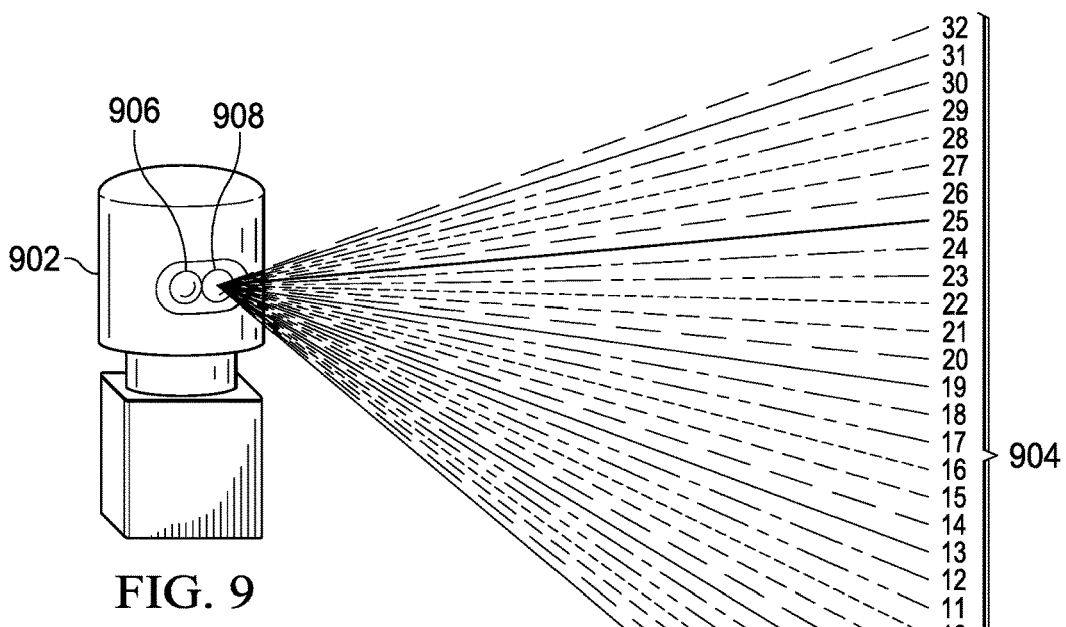
FIG. 9 is a drawing of a lidar device with scanning capabilities.

FIG. 9 is a drawing of a lidar device with scanning capabilities. Lidar scanner 902 includes transmitter 908 and receiver 906. The optics of transmitter 908 allow the laser pulse to be directed in a plurality of beams 904. The optics may include movable mirrors, digital micromirror devices (DMDs), movable prisms or other beam direction devices. In other implementations, separate laser transmitters transmit each of beams 904. Lidars like lidar scanner 902 sometimes use rotating mounts to allow for scanning an entire scene.

Using a system like that of FIG. 1, each of the plurality of beams 904 must allow for the time of flight for the maximum range of the device. If a second transmission occurs before the return of the first transmission, the receiving photodiode may pick up a reflection of the second transmission or scatter from the second transmission. Either one could cause an erroneous distance estimate. Therefore, each subsequent transmission must delay until it is certain that such a conflict will not occur, i.e. the time of flight for the maximum range of the device. Using an embodiment like that of FIG. 4, an orthogonal code can be provided for each beam. Therefore, using an embodiment like that of FIG. 4, a lidar such as lidar scanner 902 may transmit a subset or all of beams 904 simultaneously without interference between the various beams. Use of the orthogonal codes of the embodiments allows for much faster scanning or simultaneous transmission for configurations with separate lasers for each of beams 904.

Figure 10:
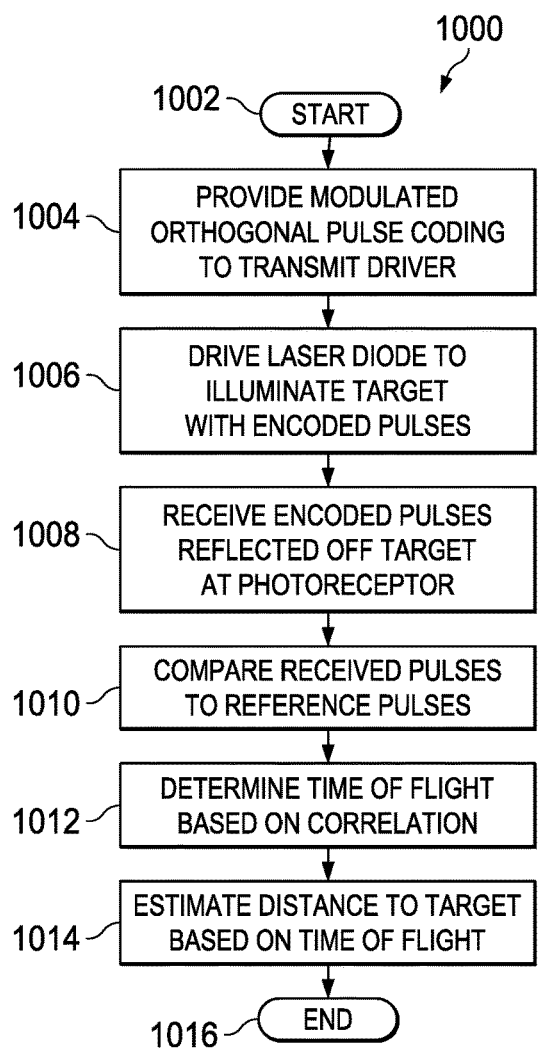
FIG. 10 is a flow diagram of an embodiment method.

FIG. 10 is a flow diagram of an embodiment method. Method 1000 starts with step 1002. Step 1004 provides a modulated orthogonal pulse code (as described hereinabove) to the transmit driver (404, FIG. 4). Step 1006 drives a laser diode (406, FIG. 4) with a driving signal (405, FIG. 4) to illuminate that target with a modulated series of pulses. Step 1008 receives the modulated pulses reflected off the target. Step 1010 compares the received signal to the transmitted signal to determine the time of flight. The reference pulses of step 1010 may be provided by a monitoring photodiode, such as photodiode 420 (FIG. 4), or by providing the code directly from the encoder 401 to demodulator 418 (FIG. 4). Step 1012 determines the time of flight based on the correlation of the received pulses and the transmitted pulses. Step 1014 estimates the distance of the object based on the time of flight. The method ends with step 1016.

In the description hereinabove, laser diodes transmit the pulse. However, other laser devices and well-focused light sources may be used. In addition, in the description hereinabove, photodiodes receive the pulse. However, other types of photoreceptors may be effectively used.

Use of the orthogonal codes, other codes and pulses of example embodiments results in interference free operation of lidars even in environments where multiple lidars are in use simultaneously.

Modifications are possible in the described embodiments, and other embodiments are possible, within the scope of the claims.

What is claimed is:

1. An integrated circuit, comprising:
   an encoder adapted to be coupled to an optical transmitter, the encoder configured to drive the optical transmitter to emit light having a sequence of encoded pulses according to a code, the encoded pulses including first and second pulses, in which a width or an amplitude of the first pulse varies from a width or an amplitude of the second pulse; and
   a demodulator adapted to be coupled to an optical receiver, the demodulator configured to receive a signal from the optical receiver, in which the received signal includes pulses of a reflection of the emitted light, and the demodulator is configured to estimate a distance of the reflection by comparing the encoded pulses to the received signal's pulses.

2. The integrated circuit of claim 1, wherein the code is encoded using pulse position modulation.

3. The integrated circuit of claim 1, wherein the code is preassigned.

4. The integrated circuit of claim 1, wherein the code is generated using a pseudo random generator.

5. The integrated circuit of claim 1, wherein the demodulator includes an analog to digital converter configured to convert the received signal into a digital value.

6. The integrated circuit of claim 1, wherein the demodulator includes a time to digital converter configured to convert the received signal into time signals.

7. The integrated circuit of claim 1, wherein the optical transmitter is a laser diode.

8. The integrated circuit of claim 1, wherein the optical receiver is a photodiode.

9. An apparatus, comprising:
   an encoder having an encoder output and configured to provide a driving signal at the encoder output;
   an optical transmitter having a transmitter input coupled to the encoder output, the optical transmitter configured to emit light responsive to the driving signal, the emitted light having a sequence of encoded pulses according to a code, the encoded pulses including first and second pulses, in which a width or an amplitude of the first pulse varies from a width or an amplitude of the second pulse;
   an optical receiver having a receiver output, the optical receiver configured to receive a reflection of the emitted light and to provide a reflection signal at the receiver output that includes pulses of the reflection; and
   a demodulator having a demodulator input coupled to the receiver output, the demodulator configured to estimate a distance of the reflection by comparing the encoded pulses to the reflection signal's pulses.

10. The apparatus of claim 9, wherein the code is encoded using pulse position modulation.

11. The apparatus of claim 9, wherein the demodulator includes an analog to digital converter configured to convert the reflection signal into a digital value.

12. The apparatus of claim 9, wherein the code is preassigned.

13. The apparatus of claim 9, wherein the code is generated using a pseudo random generator.

14. The apparatus of claim 9, wherein the optical transmitter is a laser diode.

15. The apparatus of claim 9, wherein the optical receiver is a photodiode.

16. A method, comprising:
   at an optical transmitter, emitting light having a sequence of encoded pulses that include first and second pulses, in which a width or an amplitude of the first pulse varies from a width or an amplitude of the second pulse;
   at an optical receiver, receiving a reflection of the emitted light, and providing a signal that includes pulses of the reflection;
   determining a time of flight by comparing the encoded pulses to the provided signal's pulses; and
   responsive to the time of flight, estimating a distance of the reflection.

17. The method of claim 16, wherein the encoded pulses are encoded with an orthogonal code using pulse position modulation.

18. The method of claim 16, wherein the encoded pulses are encoded with a preassigned code.

19. The method of claim 16, wherein the encoded pulses are encoded with a code that is generated using a pseudo random generator.

* * * * *